US012670437B2

(12) United States Patent
Hickie et al.

(10) Patent No.: US 12,670,437 B2
(45) Date of Patent: Jun. 30, 2026

(54) IDENTIFYING, OR CHECKING INTEGRITY OF, A MACHINE-LEARNING CLASSIFICATION MODEL

(71) Applicant: IRDETO B.V., Hoofddorp (NL)

(72) Inventors: Thomas Hickie, Hoofddorp (NL); Shufei He, Hoofddorp (NL)

(73) Assignee: IRDETO B.V., Hoofddorp (NL)

( * ) Notice: Subject to any disclaimer, the term of this patent is extended or adjusted under 35 U.S.C. 154(b) by 854 days.

(21) Appl. No.: 17/982,896

(22) Filed: Nov. 8, 2022

(65) Prior Publication Data

US 2023/0196195 A1     Jun. 22, 2023

(30) Foreign Application Priority Data

Nov. 22, 2021     (EP) ..................................... 21209502

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS

| | | | | |
|---|---|---|---|---|
| 10,410,111 B2 * | 9/2019 | Husain | ................ | G06F 11/3447 |
| 10,719,301 B1 * | 7/2020 | Dasgupta | ............. | G06N 3/0464 |
| 12,210,937 B2 * | 1/2025 | J | ............................ | G06N 20/20 |
| 2009/0018982 A1 * | 1/2009 | Morrison | ................ | G06F 17/18 |
| | | | | 706/12 |
| 2014/0379619 A1 * | 12/2014 | Permeh | .................... | G06N 5/02 |
| | | | | 706/12 |
| 2016/0055589 A1 * | 2/2016 | Billings | ................ | G06Q 40/08 |
| | | | | 705/4 |
| 2017/0300635 A1 * | 10/2017 | Ganesan | ................ | G16H 15/00 |
| 2018/0330280 A1 * | 11/2018 | Erenrich | ................. | G06N 5/04 |
| 2018/0374098 A1 * | 12/2018 | Zhang | .................... | G06F 18/214 |
| 2019/0122096 A1 * | 4/2019 | Husain | ................ | G06F 11/3495 |
| 2021/0295209 A1 * | 9/2021 | Lancioni | ................ | G06N 3/088 |

OTHER PUBLICATIONS

EP Application No. 21209502.0-1203; Extended Search Report dated May 27, 2022.

(Continued)

*Primary Examiner* — Maikhanh Nguyen
(74) *Attorney, Agent, or Firm* — James J. DeCarlo; Greenberg Traurig, LLP

(57) ABSTRACT

Disclosed is a method for identifying whether a classification system is configured to use a specific machine-learning classification model. The method involves using the classification system to generate, for each test sample in a predetermined test set, a corresponding classification result, and identifying either (i) that the classification system is using the specific machine-learning classification model or (ii) that the classification system is not using the specific machine-learning classification model. The test set is associated with the specific machine-learning classification model and, for each test sample in the test set, there is a corresponding small modification for that test sample that causes a change in the classification result produced for that test sample using the specific machine-learning classification model.

11 Claims, 8 Drawing Sheets

(56)               References Cited

OTHER PUBLICATIONS

"Attacking Machine Learning with Adversarial Examples" Feb. 24, 2017; https://openai.com/blog/adversarial-example-research/.

Cao Xiaoyu Cao@Duke Edu et al: "IP Guard: Protecting Intellectual Property of Deep Neural Networks via Fingerprinting the Classification Boundary", The 2021 ACM/SIGDA International Symposium on Field-Programmable Gate Arrays, ACMPUB27, New York, NY,. USA, May 24, 2021, pp. 14-25.

"Getting to know a black-box model—toward data science" Jul. 24, 2018; https://towardsdatascience.com/getting-to-know-a-black-box-model-374e180589ce.

Stealing Machine Learning Models via Prediction APIs—Aug. 10-12, 2016; https://www.usenix.org/system/files/conference/usenixsecurity16/sec16_paper_tramer.pdf.

Wang Si et al: "Fingerprinting Deep Neural Networks—a DeepFool Approach", 2019 IEEE International Symposium on Circuits and Systems (ISCAS), IEEE, May 22, 2021, pp. 1-5.

Wikipedia; Machine Learning; Nov. 19, 2021; 27 pages; https://en.wikipedia.org/w/index.php?title=Machine_learning&oldid=1056130010.

Wikipedia; Statistical Classification; Jun. 11, 2021; 6 pages; https://en.wikipedia.org/w/index.php?title=Statistical_classification&oldid=1027955730.

* cited by examiner

IDENTIFYING, OR CHECKING INTEGRITY OF, A MACHINE-LEARNING CLASSIFICATION MODEL

FIELD OF THE INVENTION

The present invention relates to: methods for identifying whether a classification system is configured to use a specific machine-learning classification model; methods for generating a test set for use in such method for identifying whether a classification system is using a specific machine-learning classification model; and apparatus and computer programs for carrying out such methods.

BACKGROUND OF THE INVENTION

Artificial intelligence (AI) or machine learning (ML) techniques are being used in ever more deployment scenarios, particularly as the processing capabilities of devices/systems continue to improve. These techniques involve creating and training a model—the trained model may then be used for whatever purpose the AI/ML is intended for. The training often uses a substantial amount of training data (or training samples), which can be costly and timely to acquire and maintain, and may be commercially sensitive. The training process itself can take a substantial amount of time to complete. As is well-known there are many different types of ML algorithm for creating/building a model—these different types of ML algorithm result in differently structured models that are trained and that operate in different ways, and that have different representations. For example, ML algorithms such as artificial neural networks, decision trees, support vector machines, etc. are all well-known, and may be implemented in many different ways—the trained models implemented/generated by such techniques can be used to generate an output (or a prediction or a decision) based on an input, the model having "learned" how to do this from the set of training data/samples. As ML algorithms, their models, representations, implementations and training are very well-known, they shall not be described in more detail herein except where necessary for understanding. More information on ML and ML models can be found at https://en.wikipedia.org/wiki/Machine_learning #Models, the entire contents of which is incorporated herein by reference.

Once deployed, the trained ML model may be susceptible to unauthorized use or modification. For example, an entity may have licensed some specific use of the trained ML model, but may then use it in an unauthorized manner (e.g. outside the boundaries of permitted use specified by the licence). Similarly, an entity may acquire the trained ML model via an unauthorized channel, and may therefore benefit from the use of the trained ML model without having to have expended the time and cost for: acquiring training data; selecting/configuring/designing the architecture for the ML algorithm and model; and performing training and testing to obtain the resultant model. It would, therefore, be desirable to be able to confirm the identity of an ML model, e.g. so that the originator/generator of the trained ML model can check whether an entity may be using their trained ML model in an unauthorized manner, i.e. whether a "suspect" trained ML model that an entity is using is actually the trained ML model developed by the originator/generator. Indeed, it would be desirable to be able to do this in a manner where access to the "suspect" ML model is restricted, in the sense that internal weights/values/results etc. of the "suspect" ML model may not be accessible but only the resulting outputs of the "suspect" ML model are accessible, e.g. if the deployed "suspect" ML model is operating behind an interface, such as a webpage, and the only interaction with the "suspect" ML model is via the interface (e.g. by providing an input and receiving a final result from the "suspect" ML model without being able to access intermediate weights/values/results).

Similarly, once deployed, it is possible that a modification may be made to an ML model. Such modifications could be made inadvertently, e.g. due to an error/malfunction of software, hardware, memory, etc. Alternatively, such modifications could be malicious (e.g. an attacker deliberately attempting to change the ML model so as to induce erroneous results). Such modifications could have serious consequences—e.g. an ML model may have been trained to identify road signs, with a view to guiding an autonomous vehicle, and a modification to such a trained ML model could result in incorrect vehicle operation, potentially leading to an accident. It would, therefore, be desirable to be able to verify that the ML model that is being used in a particular deployment is, indeed, the intended/desired ML model or, put another way, it would be desirable to be able to verify the integrity of a deployed ML model. Again, depending on the deployment scenario, such verification may, or may not, have access to intermediate weights/values/results of the deployed ML model.

SUMMARY OF THE INVENTION

According to a first aspect of the invention, there is provided a method for identifying whether a classification system is configured to use a specific machine-learning classification model, the method comprising: using the classification system to generate, for each test sample in a predetermined test set that comprises a plurality of test samples, a corresponding classification result; and identifying either (i) that the classification system is using the specific machine-learning classification model if, for each test sample in the test set, the corresponding classification result matches a classification result produced for that test sample using the specific machine-learning classification model or (ii) that the classification system is not using the specific machine-learning classification model if there is a test sample in the test set for which the corresponding classification result does not match the classification result produced for that test sample using the specific machine-learning classification model; wherein the test set is associated with the specific machine-learning classification model and, for each test sample in the test set, there is a corresponding small modification for that test sample that causes a change in the classification result produced for that test sample using the specific machine-learning classification model.

According to a second aspect of the invention, there is provided a method of generating a test set for use in the method for identifying whether a classification system is using a specific machine-learning classification model according to the above-mentioned first aspect, the test set associated with the specific machine-learning classification model, wherein the test set comprises a plurality of test samples and, for each test sample in the test set, there is a corresponding small modification for that test sample that causes a change in the classification result produced for that test sample using the specific machine-learning classification model, wherein the method comprises: obtaining a first set that comprises a plurality of candidate samples applicable to the specific machine-learning classification model; and updating the first set, said updating comprising, for each candidate sample, performing a corresponding sequence of one or more update steps, wherein each update step comprises: generating a second candidate sample based on said candidate sample; generating, for each of said candidate sample and the second candidate sample, a corresponding classification measure using the specific machine-learning classification model; and assessing the generated classification measures, wherein said assessing comprises: based on a comparison of the generated classification measures, performing one or more of: (a) terminating the sequence of one or more update steps; (b) setting said candidate sample to be the second candidate sample if the comparison indicates that the second candidate sample is more likely than the said candidate sample to have a corresponding small modification that causes a change in classification result produced using the specific machine-learning classification model; wherein the test set comprises some or all of the updated first set.

In some embodiments of the second aspect, said generating a second candidate sample based on said candidate sample comprises generating the second candidate sample by performing a random change to said candidate sample.

In some embodiments of the second aspect, for each candidate sample, for each update step of a first subsequence of the corresponding sequence of one or more update steps: for each of said candidate sample and the second candidate sample, the corresponding classification measure is a score generated by: using the specific machine-learning classification model to generate a corresponding plurality of values, each value indicative of that sample belonging to a corresponding class; and using a score function to generate the score for that sample based on the corresponding plurality of values, the score indicative of a likelihood that there is a small modification for that sample that causes a change in the classification result produced for that sample using the specific machine-learning classification model; and assessing the generated classification measures comprises: if the classification measure for the second candidate sample is indicative of a higher likelihood than the classification measure for said candidate sample, setting said candidate sample to be the second candidate sample. In some such embodiments, for each candidate sample, for each update step of a second subsequence of the corresponding sequence of one or more update steps after the first subsequence: for each of said candidate sample and the second candidate sample, the corresponding classification measure is an identification of the class for that sample generated using the specific machine-learning classification model; and assessing the generated classification measures comprises: if the classification measure for the second candidate sample is the same as the classification measure for said candidate sample, terminating the second subsequence; if the classification measure for the second candidate sample is not the same as the classification measure for said candidate sample: for each of said candidate sample and the second candidate sample: using the specific machine-learning classification model to generate a corresponding plurality of values, each value indicative of that sample belonging to a corresponding class; and using a score function to generate the score for that sample based on the corresponding plurality of values, the score indicative of a likelihood that there is a small modification for that sample that causes a change in the classification result produced for that sample using the specific machine-learning classification model; and if the score for the second candidate sample is indicative of a higher likelihood than the score for said candidate sample, setting said candidate sample to be the second candidate sample.

In some embodiments of the second aspect, each value represents a probability that the corresponding sample belongs to the corresponding class. In some such embodiments, for each of the first candidate sample and the second candidate sample, the corresponding plurality of values are normalized to have a predetermined total.

In some embodiments of the second aspect, for each candidate sample, for each update step of a first subsequence of the corresponding sequence of one or more update steps: for each of said candidate sample and the second candidate sample, the corresponding classification measure is an identification of class for that sample generated using the specific machine-learning classification model; assessing the generated classification measures comprises: if the classification measure for the second candidate sample is the same as the classification measure for said candidate sample, terminating the first subsequence if a termination condition is met; if the classification measure for the second candidate sample is not the same as the classification measure for said candidate sample: setting said candidate sample to be the second candidate sample; and reducing the size of the random change to be applied to the candidate sample when generating a second candidate sample at the next update step.

In some embodiments of the first or second aspect, one or more of the test samples in the test set are generated as adversarial examples for the specific machine-learning classification.

According to a third aspect of the invention, there is provided an apparatus arranged to carry out a method according to the first or second aspect or any embodiment thereof.

According to a fourth aspect of the invention, there is provided a computer program which, when executed by one or more processors, causes the one or more processors to carry out a method according to the first or second aspect or any embodiment thereof. The computer program may be stored on a computer-readable medium.

BRIEF DESCRIPTION OF THE DRAWINGS

Embodiments of the invention will now be described, by way of example only, with reference to the accompanying drawings, in which:

FIG. 5b schematically illustrates the operation of the method shown in FIG. 5a;

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

(a) System Overview

Figure 1:
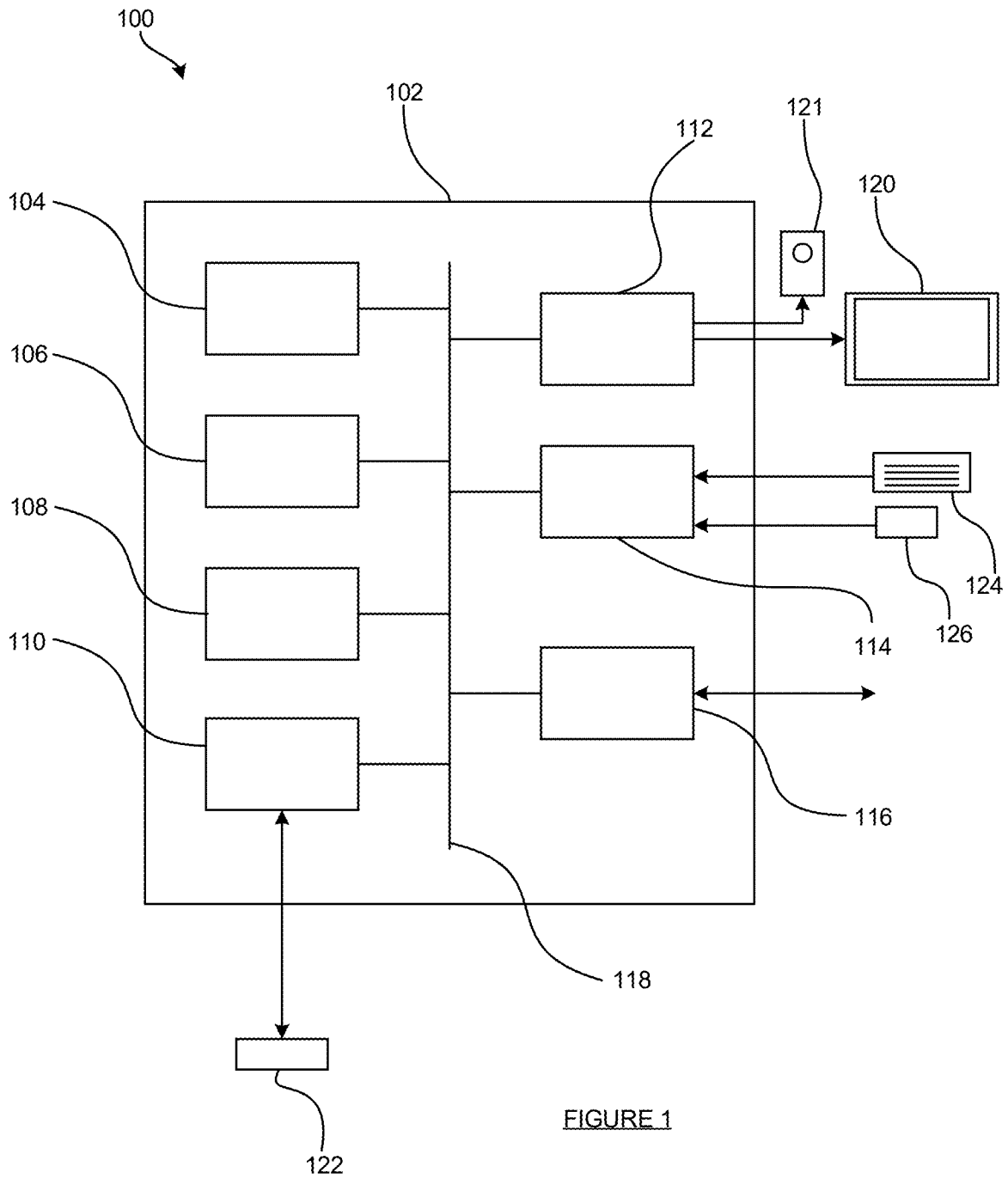
FIG. 1 schematically illustrates an example of a computer system.

FIG. 1 schematically illustrates an example of a computer system 100. The system 100 comprises a computer 102. The computer 102 comprises: a storage medium 104, a memory 106, a processor 108, an interface 110, a user output interface 112, a user input interface 114 and a network interface 116, which may be linked together over one or more communication buses 118.

The storage medium 104 may be any form of non-volatile data storage device such as one or more of a hard disk drive, a magnetic disc, a solid-state-storage device, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random access memory (storage unit or volatile storage medium) suitable for storing data and/or computer programs (or software or instructions or code).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel, separately or in cooperation with each other. The processor 108, in carrying out data processing operations for embodiments of the invention, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device 122 may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments of the invention. As examples, the computer system 100 could comprise one or more of: a personal computer; a server computer; a mobile telephone; a tablet; a laptop; a television set; a set top box; a games console; other mobile devices or consumer electronics devices; etc. Additionally, it is possible that some components of the computer system 100 are not located in the computer 102 and are, instead, part of a computer network connected to the computer 102 via the network interface 116. Additionally or alternatively, the computer system 100 may comprise multiple computers 102, e.g. in a network of computers such as a cloud system of computing resources.

Figure 2A:
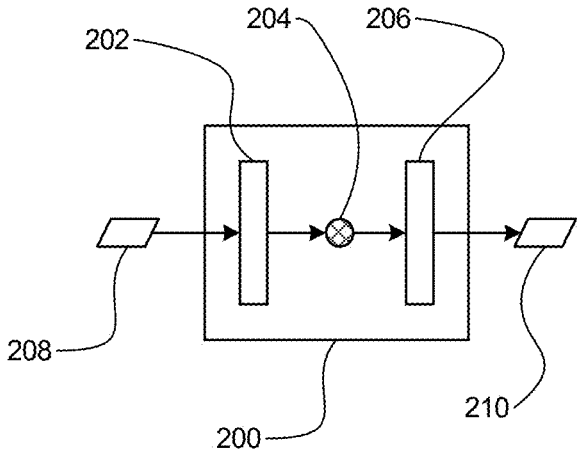
FIG. 2a schematically illustrates an example classification system.

FIG. 2*a* schematically illustrates an example classification system 200. The classification system 200 may, for example, be implemented using one or more computer systems 100 as discussed with reference to FIG. 1.

The classification system 200 comprises an input (or interface) 202 for receiving (or obtaining) an input sample 208 (or an amount of input data). The classification system 200 uses, or executes, an ML classification model (or a trained ML classification algorithm) 204 to perform classification on the input sample 208. For example, the ML classification model 204 may be arranged to identify that the input sample 208 corresponds to one class $C_j$ from a plurality (or set) of $N_c$ known classes or categories $\{C_k: k=1, \ldots, N_c\}$. Alternatively, the ML classification model 204 may be arranged to identify, for each class $C_j$ of a plurality (or set) of $N_c$ known classes $\{C_k: k=1, \ldots, N_c\}$, a corresponding weight or value representing a likelihood or probability that the input sample 208 belongs to that class $C_j$. The ML classification system 200 comprises an output (or interface) 206 for providing a result (or output) 210 for the classification performed for the input sample 208 using the ML classification model 204. For example, the result 210 may comprise an indication of a class $C_j$ to which, according to the ML classification model 204, the input sample 208 belongs or corresponds. Such an indication may be accompanied by an indication of confidence, or probability, that the input sample 208 does indeed belong to that class $C_j$.

The classification system 200 may, of course, be a component of (or a sub-system of) a larger system—the larger system may be arranged to provide the input sample 208 to the classification system 200 and use the result 210 generated by the classification system 200. For example: the larger system could be an engine; the input sample 208 may comprise measurements from sensors around/within engine; the classification system 200 may be arranged to use its ML classification model 204 to classify the input sample 208 as either a normal status for the engine or a malfunctioning status for the engine; if the result 210 provided by the classification 200 to the engine indicates that the input sample 208 corresponds to a malfunctioning status, then then engine may be arranged to shut down or raise an alarm.

The input interface 202 may be the same as, or may be different from, the output interface 206. The input interface 202 and/or the output interface 206 may, for example, comprise one or more webpages or user interfaces. Additionally or alternatively, the input interface 202 and/or the output interface 206 may simply be arranged, respectively, to access the input sample 208 from, or store the result 210 to, a storage device or medium of the classification system 200. It will be appreciated that the input interface 202 and the output interface 206 may take other forms, depending on the specific deployment scenario for the classification system 200.

Of course, the nature of the input sample 208 and the classes $\{C_k: k=1, \ldots, N_c\}$ may vary widely depending on the application/use of the classification system 200. For example, the classification system 200 may be part of an autonomous vehicle—the input sample 208 may comprise one or more images captured by one or more cameras of the vehicle, and the ML classification model 204 may be arranged to classify the input sample 208 with a view to the result 210 being used to help control the driving of the vehicle. The classes $\{C_k: k=1, \ldots, N_c\}$ may then correspond to: images that contain or depict a road sign; images that contain or depict an obstacle (e.g. another vehicle or a pedestrian etc.); and so on. Similarly, the classification system 200 may be arranged to identify a language being spoken in an input audio sample 208 (e.g. audio captured by a microphone), with a view to the result 210 identifying one or more likely languages being spoken within that input audio sample 208. The classes $\{C_k: k=1, \ldots, N_c\}$ may then correspond to the different languages being spoken. As another example, the classification system 200 may be arranged to identify whether or not an email input sample 208 is spam. The classes $\{C_k: k=1, \ldots, N_c\}$ may then correspond to spam and non-spam emails.

Figure 2B:
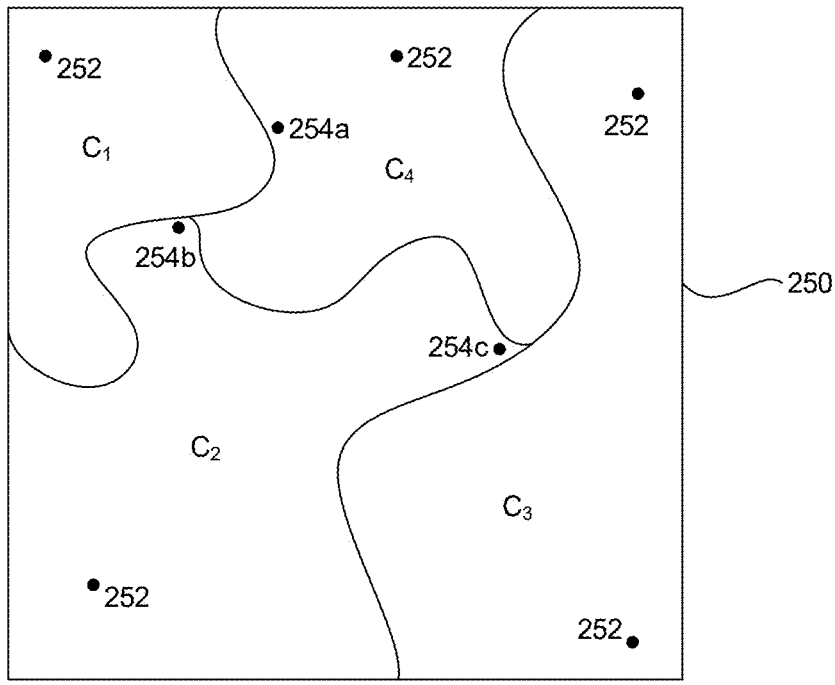
FIG. 2b illustrates an example of classification that may be performed.

FIG. 2b illustrates an example of classification that may be performed. In this example, $N_c=4$, so that there are four classes: $C_1, C_2, C_3, C_4$. It will, of course, be appreciated that $N_c$ may take other values. Additionally, in this example, the input space or sample space 250 (i.e. the set of all possible/valid input samples 208 suitable for input to the classification model 204) is represented as a two-dimensional sample space 250, with the input samples 208 then being points in this two-dimensional sample space 250. Again, it will be appreciated that this is merely one example for ease of illustration, and that the sample space 250 and the input samples 208 may take many different representations. The ML classification model 204 results in, or corresponds to or implements, a partition of the sample space 250 into different regions corresponding to the various classes $\{C_k: k=1, \ldots, N_c\}$—the region for a given class C, may be connected or, alternatively, may be formed from multiple non-connected smaller regions. Thus, for a given input sample 208, the result 210 of the classification by the ML classification model 204 may simply be an indication of the class C; corresponding to the region/partition of the sample space 250 in which that input sample 208 is located. As mentioned, the result 210 may also comprise an indication of confidence or probability that the input sample 208 belongs to that class $C_j$.

As classification systems are well-known, they shall not be described in more detail herein. Further information on ML classification can be found, for example, at https://en.wikipedia.org/wiki/Statistical_classification, the entire contents of which are incorporated herein by reference.

A modification to the ML classification model 204 would change at least some of the boundaries between some of the classes $\{C_k: k=1, \ldots, N_c\}$. Put another way, a modification to the ML classification model 204 would change the result 210 for at least some samples 208 of the sample space 250. Likewise, a different ML classification model, even if it used the same classes $\{C_k: k=1, \ldots, N_c\}$, would have different boundaries between those classes in the sample space 250 and therefore would, for at least some samples 208 of the sample space 250, produce a different result 210. Indeed, even two ML classification models, trained on the same training data using the same underlying ML algorithm, may end up being different from each other, producing a different result 210 for one or more input samples 208.

As can be seen, some input samples 208 (represented, for example, by points 252 in FIG. 2b) are relatively far away from the boundaries of the regions/partitions for their corresponding classes. Thus, a modification to the ML classification model 204 (or the implementation of a different ML classification model 204) is unlikely to change the classification result 210 for those samples 252. However, some input samples 208 (represented, for example, by points 254a, 254b, 254c) are relatively close to the boundaries of the regions/partitions for their corresponding classes. Thus, a modification to the ML classification model 204 (or the implementation of a different ML classification model 204) is likely to change the classification result 210 for one or more of these input samples 254, or at least is substantially more likely to change the classification result 210 for the input samples 254 than for the input samples 252. For example, a small modification to the ML classification model 204 (or the implementation of a different ML classification model 204) could: (a) move the boundary between $C_1$ and $C_4$ so that the input sample 254a is classified in class $C_1$ instead of $C_4$; (b) move the boundary between $C_2$ and $C_1$ and/or $C_4$ so that the input sample 254b is classified in class $C_1$ or $C_4$ instead of $C_2$; (c) move the boundary between $C_2$ and $C_3$ and/or $C_4$ so that the input sample 254c is classified in class $C_3$ or $C_4$ instead of $C_2$. Thus, as will be appreciated, some input samples 208 available from the sample space 250 may be more "sensitive" to a change (even a small change) to the ML classification model 204 than other input samples 208, in that some input samples 208 are more likely to have a change in their corresponding classification result 210 due to a change (even a small change) to the ML classification model 204 than other input samples 208. The "sensitive" samples may be viewed as samples for which, according to the ML classification model 204, the evidence for the sample belonging to just one class is low. Put another way, the "sensitive" samples may be viewed as samples for which there is a small modification or perturbation of that sample that would result in a change in classification result for that sample—i.e. they are near at least one of the class boundaries. In others words, given a set of different ML classification models for the sample space 250, the "sensitive" samples 254 are statistically more likely to have different classification results 210 for at least two of the models than the samples 252.

Now, one way to identify whether a "suspect" ML classification model corresponds to a specific (or particular/ target) ML classification model would be to obtain, for each of a plurality of test samples 208, a first classification result 210 using the "suspect" ML classification model and a second classification result 210 using the specific ML classification model. If, for any of the test samples 208, the corresponding first and second classification results differ, then the "suspect" ML classification model does not match the specific ML classification model. On the other hand, if, for each of the plurality of test samples 208, the corresponding first and second classification results are the same, then one may conclude/infer that the "suspect" ML classification model matches the specific ML classification model-however, without testing all possible input samples 208, this conclusion cannot be ensured. As discussed above, and as can be seen from FIG. 2b, some input samples 204 (e.g. the points 254) are more likely to provide differing classification results than other input samples 204 (e.g. the points 252) if the "suspect" ML classification model does not match the specific ML classification model. Hence, by using such "sensitive" input samples 254 (i.e. input samples 254 close to classification boundaries) as opposed to other "less sensitive" input samples 252 (i.e. input samples 252 not so close to classification boundaries), one is more likely to detect when the "suspect" ML classification model does not match the specific ML classification model and, likewise, if all of the test samples have matching classification results, one may be more confident that the "suspect" ML classification model does indeed match the specific ML classification model. This would be true even if the two ML classification models differ only in small way. Embodiments of the invention therefore operate on such a principle, namely by identifying and using a test set created for the specific ML classification model, in which the test samples in the test set are specifically chosen to be sensitive (or at least more sensitive than most other possible input samples 208) to changes in the ML classification model.

Figure 3:
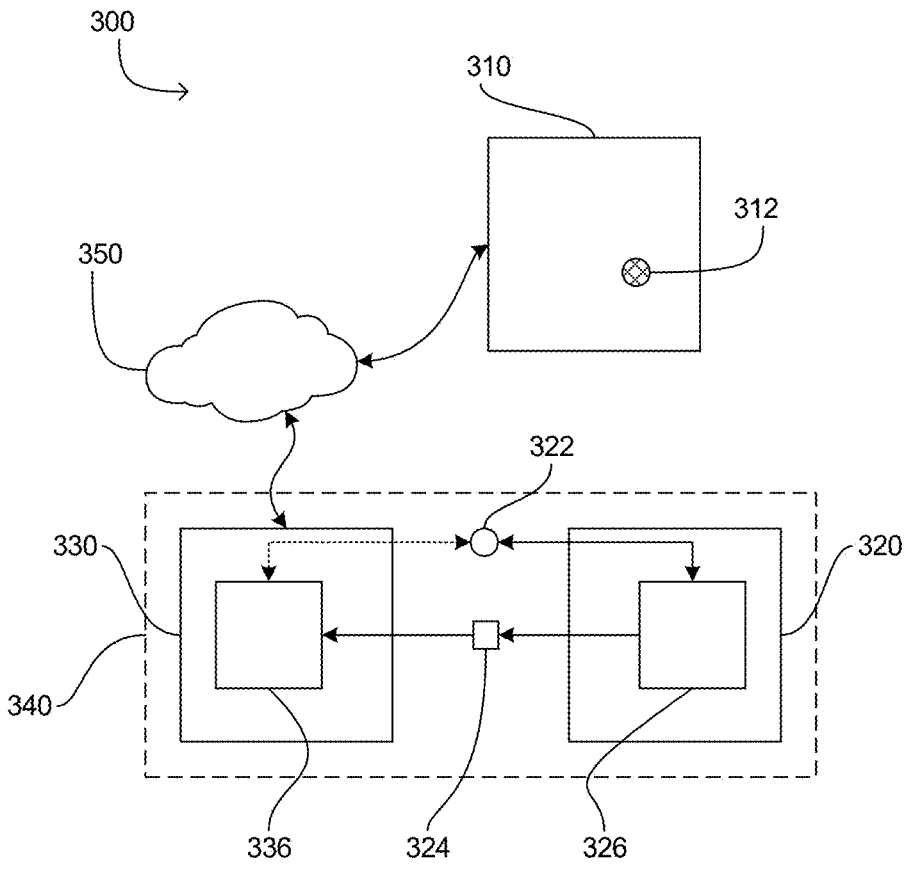
FIG. 3 schematically illustrates a system according to some embodiments of the invention.

FIG. 3 schematically illustrates a system 300 according to some embodiments of the invention. The system 300 comprises a test set creation system 320, a test system 330, and a classification system 310. The test system 330 may interact with the classification system 310 in a variety of ways, e.g. by communication over a network 350

The classification system 310 may be a classification system 200 as discussed above with reference to FIGS. 2a and 2b. As shown, the classification system 310 makes use of an ML classification model 312 (corresponding to the ML classification model 204 discussed above with reference to FIGS. 2a and 2b).

In summary, the test system 330 is arranged to try to identify whether the ML classification model 312 being used by the classification system 310 is a specific ML classification model 322. As discussed above, this may be achieved by the test system 330 supplying a plurality, or a set, of test samples to the classification system 310 and obtaining corresponding first classification results from the classification system 310 based on the classification model 312 used by the classification system 310. The test system 330 may, for example, provide the test samples to the classification system 310, and receive the corresponding first classification results back from the classification system 310, via the network 350. The test system 330 may compare these first classification results with second classification results for the set of test samples, where the second classification results are, or have been, generated using the specific ML classification model 322. Based on this comparison, the test system 330 may decide/determine whether or not the ML classification model 312 being used by the classification system 310 is the specific ML classification model 322. The purpose of the test set creation system 320 is to generate the set of test samples corresponding to the specific ML classification model 322 based on the principle of "sensitive samples" discussed above with reference to FIG. 2b.

The test set creation system 320 and the test system 330 may be implemented using one or more computer systems 100 as discussed with reference to FIG. 1. Indeed, the test set creation system 320 and the test system 330 may be implemented on the same computer system 100 and/or may be operated by the same entity and may, therefore, be viewed as a combined system, as illustrated by a dashed line 340 in FIG. 3. However, it will be appreciated that the test set creation system 320 and the test system 330 may be implemented on different computer systems 100 and/or may be operated by different entities and may, therefore, be viewed as separate systems.

The test set creation system 320 comprises a test set creation module 326. The test set creation module 326 may be implemented as software executing on, say, a processor 108 of a computer system 100 that is part of (or that forms) the test set creation system 320, or as a hardware module of the test set creation system 320, or as a combination of both software and hardware. In operation, the test set creation module 326 is arranged to use the specific ML classification model 322 to generate a test set 324 that comprises a plurality of test samples-thus, the test set 324 is associated with, or corresponds to and has been generated for, the specific ML classification model 322. Of course, the test samples of the test set 324 are samples that are valid inputs for the specific ML classification model 322 (or, to use the analogy with FIG. 2b, are samples from the sample space 250).

The test set creation system 320 may already be in possession of the specific ML classification model 322—e.g. the test set creation system 320 may have generated (or created) the specific ML classification model 322, or may have previously received/obtained the specific ML classification model 322. Alternatively, the test set creation system 330 may receive/obtain the specific ML classification model 322 from a third party (for example, via the network 302).

The test system 330 comprises a test module 336. The test module 336 may be implemented as software executing on, say, a processor 108 of a computer system 100 that is part of (or that forms) the test system 330, or as a hardware module of the test system 330, or as a combination of both software and hardware. In operation, the test module 336 is arranged to use the test set 324 (generated by the test set creation system 320) that is associated with the specific ML classification model 322, to determine whether the ML classification model 312 used by the classification system 310 is the specific ML classification model 322 to which the test set 324 relates.

In some embodiments, the specific ML classification model 322 is provided to the test set creation system 320 in advance (e.g. as part of a registration process), so that the test set creation system 320 may generate the test set 324 in advance, ready for when it is needed. Thus, the test set 324 may be stored in a storage (not shown in FIG. 3) ready for when the test system 330 needs it. In other embodiments, the specific ML classification model 322 is provided to the test set creation system 320 when the classification system 310 and its ML classification model 312 are being investigated. In such embodiments, the test set creation system 320 may generate the test set 324 for the test system 330 to then use—in this case, the test set 324 may or may not be stored in a storage.

As discussed above, the test set creation system 320 uses the specific ML classification model 322 to generate the test set 324. The test set creation system 320 may also use the specific ML classification model 322 to generate the classification results (the above-mentioned second classification results) for the test samples in the test set 324. These classification results may then be stored (e.g. in a storage, not shown in FIG. 3) in association with their corresponding test samples (e.g. as part of the test set or as metadata associated with the test set or associated with the test samples). In such embodiments, the test system 330 does not need to make use of the specific ML classification model 322, since the test system 330 may obtain both the test samples of the test set 324 and the classification results already generated for those test samples by the test set creation system 320 using the specific ML classification model 322. However, in other embodiments, the test set creation system 320 does not generate the classification results using the specific ML classification model 322—instead, the test system 330 has access to, and makes use of, the specific ML classification model 322 to generate classification results for the test samples of the test set 324.

In some embodiments, the test set creation system 320 and/or the test system 330 may have access to "raw" data output/generated by the specific ML classification model 322, e.g. intermediate results/values generated by the specific ML classification model 322 or weights used/generated by the specific ML classification model 322. In other embodiments, the test set creation system 320 and/or the test system 330 does not have access to such "raw" data output/generated by the specific ML classification model 322, i.e. the test set creation system 320 and/or the test system 330 may only have access to a final classification result 210 generated as an output using the specific ML classification model 322. For example, a first entity that created/generated the specific ML classification model 322 may engage a second entity that is operating the system 340 to determine whether or not the ML classification model 312 being used by the classification system 310 is their specific ML classification model 322—however, the first entity may not wish to provide the second entity with full access/details of their specific ML classification model 322 and may, instead, only provide the second entity with access to an input interface 202 and an output interface 206 of a classification system 210 that uses their specific ML classification model 322, so that the second entity may generate classification results 210 for test samples 208 using the specific ML classification model 322.

The network 350 may be any data communication network via which the test system 330 may communicate with the classification system 310. For example, the network 350 may comprise one or more of: a local area network, a wide area network, a metropolitan area network, the Internet, a wireless communication network, a wired or cable communication network, etc.

Figure 4:
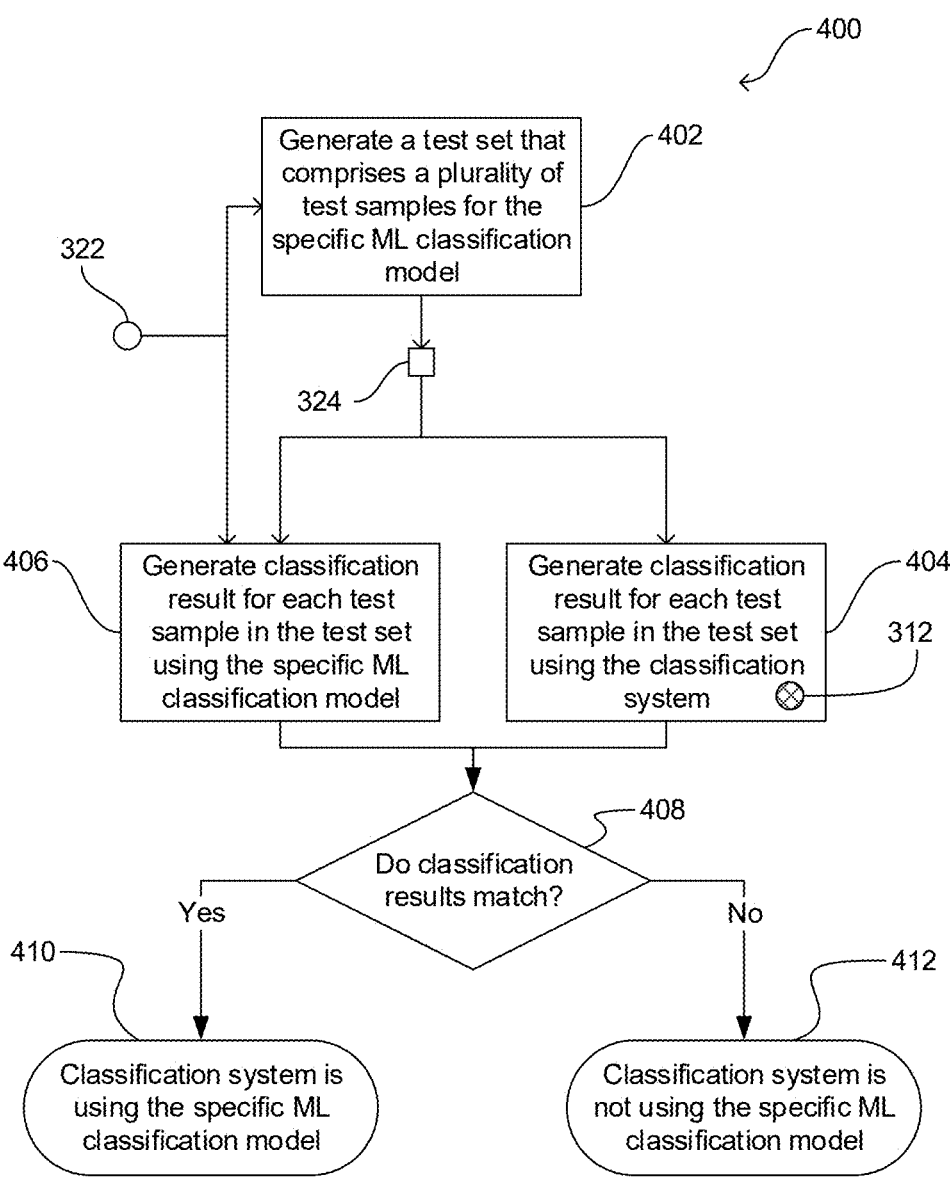
FIG. 4 is a flowchart illustrating a method, according to some embodiments of the invention, for identifying whether a classification system is configured to use a specific ML classification model.

FIG. 4 is a flowchart illustrating a method 400, according to some embodiments of the invention, for identifying whether the classification system 310 is configured to use the specific ML classification model 322 i.e. for identifying whether the ML classification model 312 is, or corresponds to, the specific ML classification model 322 (which may be, for example, for the purpose of checking the integrity of the ML classification model 312 or for determining whether the classification system 310 is using the specific ML classification model 322 without authorization).

At a step 402, the test set creation system 320 (or the test set creation module 326 thereof) generates the test set 324. As discussed above, the test set 324 is associated with, or corresponds to, the specific ML classification model 322—therefore, the test set 324, once generated, is predetermined for the specific ML classification model 322. The test set 324 comprises a plurality of test samples. The test samples are "sensitive" samples, in that, for each test sample in the test set 324, there is a corresponding small modification for that test sample that causes a change in the classification result produced for that test sample using the specific ML classification model 322. Methods of generating the test set 324 shall be described shortly. Let there be $N_S$ test samples in the test set 324 (for some integer $N_S > 1$), with the test samples being $T_j$ for $j = 1, \ldots, N_S$.

At a step 404, the test system 330 (or the test module 336 thereof) uses the classification system 310 to generate, for each test sample in the test set 324, a corresponding first classification result. Thus, the first classification results are classification results generated using the ML classification model 312 for each of the test samples in the test set 324. Thus, for each test sample $T_j$ for $j = 1, \ldots, N_S$, a corresponding first classification result $R_{1,j}$ for $j = 1, \ldots, N_S$ is generated according to the ML classification model 312.

At a step 406, for each test sample in the test set 324, a corresponding second classification result is produced, or generated, for that test sample using the specific ML classification model 322. As discussed above, the step 404 may be performed by the test set creation system 320 (e.g. by the test set creation module 326 thereof) or by the test system 330 (e.g. by the test module 336 thereof). Thus, for each test sample $T_j$ for $j = 1, \ldots, N_S$, a corresponding second classification result $R_{2,j}$ for $j = 1, \ldots, N_S$ is generated according to the specific ML classification model 322.

At a step 408, the test system 330 (or the test module 336 thereof) determines whether the first and second classification results match for the test samples.

If, at the step 408, it is determined that the first classification result matches the second classification result for each test sample in the test set 324 (i.e. that $R_{1,j} = R_{2,j}$ for $j = 1, \ldots, N_S$), then the test system 330 identifies, and therefore generates a conclusion/decision 410, that the classification system 310 is using the specific ML classification model 322 (i.e. that the ML classification model 312 matches, or equals, the specific ML classification model 322). Appropriate measures may then be taken as necessary, for example: (a) if the purpose of the check/investigation of the classification system 310 is to check the integrity of the ML classification model 312, then it may be concluded that the integrity of the ML classification model 312 has not been compromised and a log of this may be made accordingly; (b) if the purpose of the check/investigation of the classification system 310 is to check whether the classification system 310 is using the specific ML classification model 322 in an unauthorized manner, then measures may be taken to try to stop the classification system 310 from operating or, at least, from using the specific ML classification model 322.

If, on the other hand, at the step 408 it is determined that there is a test sample in the test set 324 for which the first classification result does not match the second classification result (i.e. that there exists some $k \in \{1, \ldots, N_S\}$ for which $R_{1,k} \neq R_{2,k}$), then the test system 330 identifies, and therefore generates a conclusion/decision 412, that the classification system 310 is not using the specific ML classification model 322 (i.e. that the ML classification model 312 does not match, or equal, the specific ML classification model 322). Appropriate measures may then be taken as necessary, for example: (a) if the purpose of the check/investigation of the classification system 310 is to check the integrity of the ML classification model 312, then it may be concluded that the integrity of the ML classification model 312 has been compromised and a suitable action may be taken, such as preventing the classification system 310 from using the compromised model, raising an alert, etc.; (b) if the purpose of the check/investigation of the classification system 310 is to check whether the classification system 310 is using the specific ML classification model 322 in an unauthorized manner, then no measures need to be taken to at this stage.

It will be appreciated that the test set creation system 320 may generate a test set 324 that has more test samples than the test system 330 actually needs to use at the steps 406 and 408, in which case the test system 330 may use a subset of the test set 324 (although this may still be viewed as the test set creation system 320 having generated that subset).

The method 400 could be used without the specifically generated test set 324 but instead with another test set of "regular" test samples that have not been generated so as to be "sensitive" (e.g. just random samples from the sample space 250). However, by using the specifically generated test set 324 of "sensitive" samples, embodiments of the invention enable more accurate testing, using fewer test samples to provide a more confident test result. Example experimental results for this are set out later.

(b) Test Set Generation

Figure 5A:
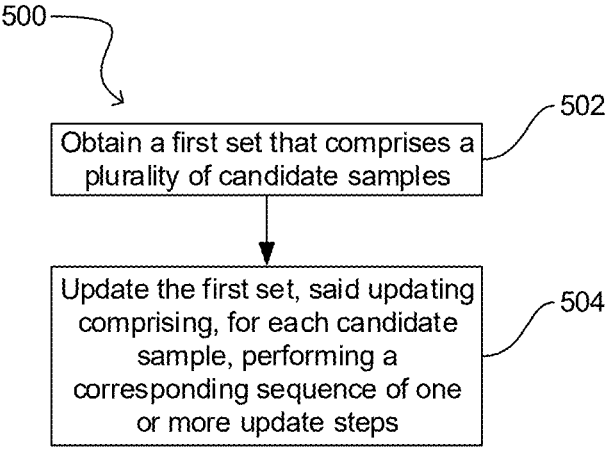
FIG. 5a is a flowchart illustrating a method of generating a test set at a step of the flowchart of FIG. 4 according to some embodiments of the invention.
Figure 5B:
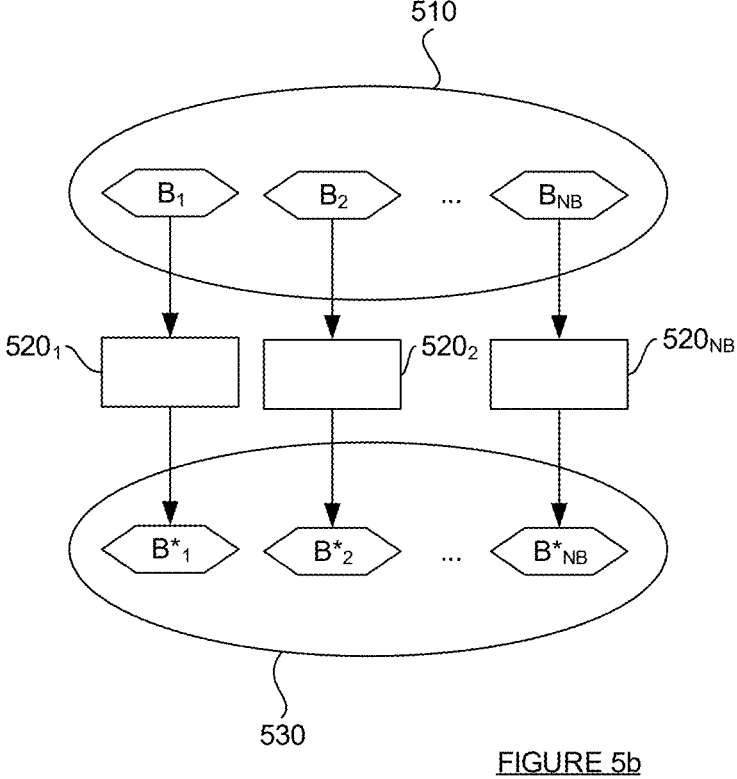

FIG. 5a is a flowchart illustrating a method 500 of generating the test set 324 at the step 402 of FIG. 4 according to some embodiments of the invention. FIG. 5b schematically illustrates the operation of the method 500 shown in FIG. 5a-both figures shall, therefore, be described together.

The method 500 begins with a step 502, at which the test set creation system 320 obtains a first set 510 that comprises a plurality of candidate samples. As shown in FIG. 5b, let there be $N_B$ candidate samples in the first set 510 (for some integer $N_B > 1$), with the candidate samples being $B_j$ for $j=1, \ldots, N_B$. Each of the candidate samples Bi ($j=1, \ldots, N_B$) is applicable to (or a valid input sample for) the specific ML classification model 322, i.e. is a sample on which the specific ML classification model 322 is intended to operate/process or, by analogy with FIG. 2b, is a sample from the sample space 250 for the specific ML classification model 322.

The value of $N_B$ may be predetermined. $N_B$ may, for example, be of the order of around 10 to 20 although, of course, the higher the value of $N_B$, the more accurate the analysis and the conclusions of the method 400 will be. Example experimental results for this are set out later, illustrating the improvements available as $N_B$ varies.

The initial candidate samples B ($j=1, \ldots, N_B$) may be randomly generated samples from the sample space 250 for the specific ML classification model 322—for example, with reference to the example of FIG. 2b, the candidate samples Bj ($j=1, \ldots, N_B$) may be randomly identified points in the sample space 250. Alternatively, the candidate samples $B_j$ ($j=1, \ldots, N_B$) may be selected to be uniformly distributed within the sample space 250 for the specific ML classification model 322. Alternatively, the candidate samples $B_j$ ($j=1, \ldots, N_B$) may be samples (chosen/selected possibly at random) from a set of training samples or test samples used for training or testing the specific ML classification model 322. It will be appreciated that other methods of choosing the first set 510 of candidate samples $B_j$ ($j=1, \ldots, N_B$) may be used.

At a step 504, the test set creation system 320 updates the first set 510. This involves, for each candidate sample B; ($j=1, \ldots, N_B$), performing a corresponding sequence 520$j$ of one or more update steps. The procedure to implement the sequence of one or more update steps may be the same for each candidate sample $B_j$ ($j=1, \ldots, N_B$), but the actual sequence of one or more update steps may vary from one candidate sample to another (e.g. if the sequence of one or more update steps 520; for the candidate sample $B_j$ ($j=1, \ldots, N_B$) depends on the value(s) assumed by the candidate sample $B_j$). In some embodiments, however, the procedure to implement the sequence of one or more update steps may be the different for two or more of the candidate samples $B_j$ ($j=1, \ldots, N_B$). The nature of the sequence 520$j$ of one or more update steps shall be described shortly with reference to FIG. 6.

As shown in FIG. 5b, performing the sequence 520$j$ of one or more update steps for the candidate sample B ($j=1, \ldots, N_B$) results in one or more corresponding updated candidate samples $B^*_j$. Thus, the step 504 generates, from the first set 510, a second set 530 of updated candidate samples $$B^*{}_j (j = 1, \ldots, N_B^*)$$

for integer—$N_B^* \geq N_B$. The second set 530 is, therefore, an updated version of the first set 510. In some embodiments, performing the sequence 520$j$ of one or more update steps for the candidate sample $B_j$ ($j=1, \ldots, N_B$) results in just one corresponding updated candidate sample $B^*_j$ (so that $$N_B^* = N_B),$$

but this need not always be the case. The test set 324 comprises some or all of the updated first set 530. In some embodiments, the test set 324 comprises all of the updated candidate samples $$B^*{}_j (j = 1, \ldots, N_B^*);$$

in some embodiments, the test set 324 comprises a subset (selected according to one or more selection criteria) of the updated candidate samples $$B^*{}_j (j = 1, \ldots, N_B^*).$$

The purpose of the sequence 520$j$ of one or more update steps for the candidate sample $B_j$ ($j=1, \ldots, N_B$) is to refine, or attempt to optimize or improve, the candidate sample $B_j$ so as to arrive at one or more test samples for the test set 324 that are more "sensitive" than the candidate sample B (or that at least, on the evidence available, appear to be more "sensitive" than the candidate sample $B_j$).

The sequence 520$j$ of one or more update steps for the candidate sample $B_j$ ($j=1, \ldots, N_B$) may be implemented in a variety of ways, examples of which are set out below. As mentioned above, in some embodiments, the test set creation system 320 and/or the test system 330 may have access to "raw" data output/generated by the specific ML classification model 322, e.g. intermediate results/values generated by the specific ML classification model 322 or weights used/generated by the specific ML classification model 322. Such "raw" data may be used as part of the sequence 520*j* of one or more update steps. With such embodiments, any statistical method that can optimize an objective function (such as particle swarm optimization, genetic algorithms, simulated annealing, stochastic gradient descent, etc.) could be used. However, in other embodiments, the test set creation system 320 and/or the test system 330 does not have access to such "raw" data output/generated by the specific ML classification model 322, i.e. the test set creation system 320 and/or the test system 330 may only have access to a final classification result 210 generated as an output using the specific ML classification model 322. With such embodiments, any searching/refining technique (such as a binary search) could be used. Specific examples are set out later.

Figure 6:
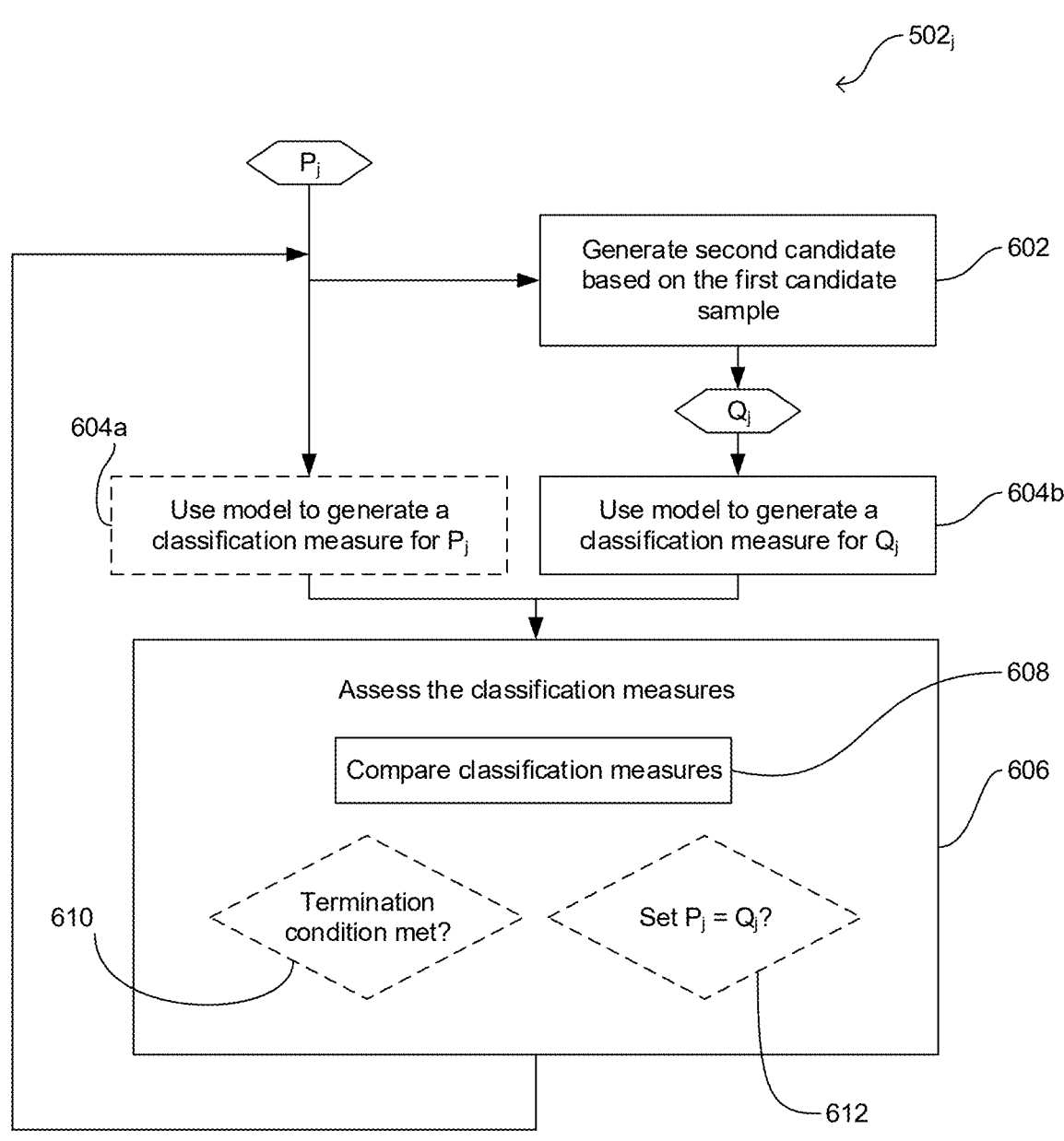
FIG. 6 is a flowchart illustrating a method of performing a sequence of one or more update steps for a candidate sample according to some embodiments of the invention.

FIG. 6 is a flowchart illustrating a general method of performing the sequence of one or more update steps 502; for the candidate sample $B_j$ (j=1, . . . , $N_B$) according to some embodiments of the invention. Each update step comprises steps 602, 604*b*, 606 and, optionally, a step 604*a*. Each update step processes a candidate sample $P_j$ and may (or may not) end up updating that candidate sample $P_j$. For the first update step in the sequence of one or more update steps 502; for the candidate sample $B_j$ (j=1, . . . , $N_B$), the candidate sample $P_j$ to be processed is set to be the candidate sample $B_j$. The updated candidate sample(s) $B^*_j$ resulting from the sequence of one or more update steps 502*j* comprise the (potentially updated) candidate sample $P_j$ from the last update step of the sequence (and possibly additional samples generated as part of this process).

At the step 602, the test set creation system 320 generates a second candidate based on the current candidate sample $P_j$. The second candidate sample $Q_j$ is a sample on which the specific ML classification model 322 is intended to operate/process (i.e. is a valid sample for the specific ML classification model 322) or, by analogy with FIG. 2*b*, is a sample from the sample space 250 for the specific ML classification model 322.

In some embodiments, the test set creation system 320 generates the second candidate sample $Q_j$ by performing a random change to the current candidate sample $P_j$. The random change may be implemented, for example, by performing a random modification or perturbation to one or more components of the current candidate sample $P_j$ —for example, if the current candidate sample $P_j$ is a vector or collection of values, then one or more of those values could be randomly perturbed. It will, of course, be appreciated that such random changes could be implemented in a variety of ways, depending on the nature of the samples themselves. In some embodiments, the size of the random change may be at most a predetermined threshold, e.g. one or more thresholds may be placed on the random change so as to impose a limit on the distance between the current candidate sample $P_j$ and the second candidate sample $Q_j$ in the sample space 250.

As shall be discussed later, however, in some embodiments the test set creation system 320 generates the second candidate sample $Q_j$ based on both the current candidate sample $P_j$ and some other information (such as another point in the sample space 250, e.g. as a midpoint between the current candidate sample $P_j$ and this other point). Hence, the generation of the second candidate sample $Q_j$ based on the current candidate sample $P_j$ may be more deterministic.

At the step 604*b*, the test set creation system 320 generates, for the second candidate sample $Q_j$, a corresponding classification measure using the specific ML classification model 322. In some embodiments, the classification measure may simply be an indication of the particular class $C_j$ from the plurality of $N_c$ known classes {$C_k$: k=1, . . . , $N_c$} to which, according to the specific ML classification model 322, the second candidate sample Q belongs. Alternatively, in some embodiments, the test set creation system 320 may be arranged to obtain from the ML classification model 322, for each class $C_j$ of the plurality of $N_c$ known classes {$C_k$: k=1, . . . , $N_c$}, a corresponding weight or value representing a likelihood (or probability or confidence) that the second candidate sample Q belongs to that class $C_j$—the classification measure may then be a score generated based on a function (or metric) of those weights or values.

The step 604*a* is the same as the 604*b*, except that it comprises the test set creation system 320 generating, for the current candidate sample $P_j$, a corresponding classification measure using the specific ML classification model 322. This is performed in the same way as for the second candidate sample $Q_j$. Now, as mentioned above, some update steps may result in updating the candidate sample $P_j$—thus, in the subsequent update step, the classification measure for this now-updated candidate sample $P_j$ needs to be generated (and therefore the step 604*a* is performed in the subsequent update step). However, some update steps may not result in updating the candidate sample $P_j$—thus, in the subsequent update step, the classification measure for the candidate sample $P_j$ is already known and does not need to be regenerated (and therefore the step 604*a* may be omitted from the subsequent update step).

At the step 606, the test set creation system 320 assesses the classification measure generated for the current candidate sample $P_j$ and the classification measure generated for second candidate sample $Q_j$. This assessment comprises:

Comparing, at a sub-step 608, the classification measure generated for the current candidate sample $P_j$ and the classification measure generated for second candidate sample $Q_j$.

Based on this comparison, performing one or more of: (a) terminating, at a sub-step 610, the sequence of one or more update steps; and (b) setting, at a sub-step 612, the current candidate sample $P_j$ to be the second candidate sample $Q_j$ if the comparison indicates that the second candidate sample $Q_j$ is more likely than the current candidate sample $P_j$ to have a corresponding small modification that causes a change in classification result produced using the specific ML classification model 322 (i.e. if the second candidate sample $Q_j$ is potentially more "sensitive" than the current candidate sample $P_j$)

The step 610 terminates the sequence of one or more update steps 502*j* for the candidate sample $B_j$ (j=1, . . . , $N_B$) if at least one termination condition (or criterion) is met. In some embodiments, at least one termination condition may be based on the comparison of the classification measure generated for the current candidate sample $P_j$ and the classification measure generated for the second candidate sample $Q_j$, e.g. if a difference between the classification measure generated for the current candidate sample $P_j$ and the classification measure generated for the second candidate sample $Q_j$ is less than a predetermined threshold (or has been less than this predetermined threshold for a predetermined number of update steps)—i.e. the sequence of one or more update steps 502; may be terminated if the test set creation system 320 assesses that there is unlikely to be further substantial improvement over the current candidate sample $P_j$. Additionally or alternatively, in some embodiments, at least one of the termination conditions is that the sequence of one or more update steps 502; for the candidate sample $B_j$ ($j=1, \ldots, N_B$) is terminated if the current update step is the Vth update step in the sequence for some non-negative integer V—i.e. the sequence of one or more update steps 502; for the candidate sample $B_j$ ($j=1, \ldots, N_B$) may be limited to at most V update steps so as to ensure that the process of generating the test set 324 terminates (or at least terminates within a certain period of time).

Assuming that a termination condition is not met at the step 610, processing continues to the next update step, in which the candidate sample to be processed will be either the current (non-updated) candidate sample $P_j$ from the current update step (i.e. if the step 612 did not set $P_j$ to be $Q_j$) or will be the second candidate sample $Q_j$ (i.e. if the step 612 did set $P_j$ to be $Q_j$).

Below are some examples of how the sequence of one or more update steps 502$j$ for the candidate sample $B_j$ ($j=1, \ldots, N_B$) may be performed. It will, however, be appreciated that other implementations/approaches are possible.

EXAMPLE 1

In this example, the second candidate sample Q is generated at the step 602 by implementing a (possibly random) change to the current candidate sample $P_j$.

In this example, the specific ML classification model 322 generates, for each class $C_j$ of the plurality of $N_c$ known classes $\{C_k: k=1, \ldots, N_c\}$, a corresponding value (or weight) $p_j$ representing a likelihood (or probability or confidence) that a given input sample 208 belongs to that class $C_j$. Thus, the value $p_j$ is indicative of that sample belonging to the corresponding class $C_j$. In this example, it is assumed that the test set creation system 320 has access to these values $p_k$ ($k=1, \ldots, N_c$), so that the test set creation system 320 can use the specific ML classification model 322 to generate the plurality of values $p_k$ ($k=1, \ldots, N_c$) for any given input sample 208.

Without loss of generality, we assume in the following that these values $p_k$ ($k=1, \ldots, N_c$) are normalized to have a predetermined total, $$\sum_{k=1}^{N_C} p_k = W$$

for some predetermined constant W. Preferably, W=1, which is what will be assumed in the following, although it will be appreciated that this is merely an example.

Generating the classification measure at the step 604$a$ for the current candidate sample $P_j$ may therefore involve the test set creation system 320 using the specific ML classification model 322 to generate the plurality of values $p_k$ ($k=1, \ldots, N_c$) for the current candidate sample $P_j$ and using a score function to generate a score (which will be the classification measure) for that sample based on the plurality of values $p_k$ ($k=1, \ldots, N_c$). The score function is arranged so that the score is indicative of a likelihood that there is a small modification for that sample that causes a change in the classification result produced for that sample using the specific ML classification model 322. The score function is, therefore, arranged so that the score is indicative of a degree of how "sensitive" the sample is likely to be.

The step 604$b$ may then use the same score function to generate a score for the second candidate sample $Q_j$ in the same way as at the step 604$a$.

The test set creation system 320 may then, as part of assessing the classification measures at the step 606, compare the scores generated at the steps 604$a$ and 604$b$ and, at the step 612, if the classification measure for the second candidate sample $Q_j$ is indicative of a higher likelihood than the classification measure for the current candidate sample $P_j$, the step 612 sets the current candidate sample $P_j$ to be the second candidate sample $Q_j$.

As an example, suppose that there are two classes, i.e. $N_c=2$, then the score function may be score=$1-|p_1-p_2|$. Thus, if the likelihood of a sample belonging to class $C_1$ is similar to the likelihood of a sample belonging to class $C_2$, then the score for that sample will be high; if the likelihood of a sample belonging to class $C_1$ is substantially different from the likelihood of a sample belonging to class $C_2$, then the score for that sample will be low. This may be viewed another way: if the sample is close to the boundary between class $C_1$ and class $C_2$ (so that the sample is "sensitive") then the values of $p_1$ and $p_2$ are likely to be similar, resulting in a high score; if the sample is far from the boundary between class $C_1$ and class $C_2$ (so that the sample is not "sensitive") then the values of $p_1$ and $p_2$ are likely to be very different, resulting in a low score.

For example:

If, for a first sample 208, $p_1=0.99$ and $p_2=0.01$, then the score for the first sample is score=$1-|0.99-0.01|=0.02$, which is low. This first sample 208 is not very "sensitive".

If, for a second sample 208, $p_1=0.60$ and $p_2=0.40$, then the score for the second sample is score=$1-|0.60-0.40|=0.80$, which is quite high. This second sample 208 is quite "sensitive", and makes for a better test sample for the test set 234 than the first sample 208.

If, for a third sample 208, $p_1=0.51$ and $p_2=0.49$, then the score for the third sample is score=$1-|0.51-0.49|=0.98$, which is very high. This third sample 208 is very "sensitive", and makes for a better test sample for the test set 234 than the first or second samples 208.

It will be appreciated that other score functions could be used. For example, with $N_c=2$, the score function could be score=$1-(p_1-p_2)^2$.

As a further example, for a sample with normalized values $p_k$ ($k=1, \ldots, N_c$) such that $$\sum_{k=1}^{N_C} p_k = 1,$$

let $\mu$ be the mean of the normalized values $p_k$ ($k=1, \ldots, N_c$), i.e.

$$\mu = \frac{1}{N_c} \sum_{k=1}^{N_C} p_k.$$

Then the score function used could be $$\text{score} = 1 - \left( \sum_{k=1}^{N_C} |p_k - \mu| \right)^2.$$

As a further example, consider a sample with normalized values $p_k(k=1, \ldots, N_c)$ such that $$\sum_{k=1}^{N_C} p_k = 1. \qquad 5$$

Let $P=\{p_1, p_2, \ldots, p_{N_c}\}$, and let $p_i$ and $p_j$ be the two largest elements of $P$ (so that the two most likely classes for this sample are $C_i$ and $C_j$), then the score function used could be score=$1-|p_i-p_j|$ or score=$1-(p_i-p_j)$. One of the advantages of such a score function is that, in general, fewer iterations/updates are needed to generate the test set 324.

As another example, given that there are No known classes $\{C_k: k=1, \ldots, N_c\}$, a score function may be based on values $p_k$ for just a subset of the classes. For example, there are $$\frac{1}{2} N_C (N_C - 1) \qquad 20$$

unordered pairs of classes—e.g. if $N_c=3$ then there are 3 unordered pairs of classes, namely $(C_1, C_2)$, $(C_1, C_3)$ and $(C_2, C_3)$. For one such pair of classes, $(C_i, C_j)$, any of the above example score functions could be used for a sample based just on the values $p_i$ and $p_j$ for those two classes (so as to help update that sample towards a boundary between those two classes). This could be done likewise for samples for some or all of the other pairs of classes. Additionally, this may be done as well as obtaining an updated candidate sample using a score function that operates on more than just two of the values $p_k(k=1, \ldots, N_c)$.

In some embodiments, the score function is arranged to provide higher scores for samples 208 that have one or more of the following characteristics: (a) a high, but nearly equal probability, of belonging to two or more classes; (b) a low probability of membership of all classes; (c) a low but non-zero probability of membership in a (proper) subset of classes.

Thus, in this example, the method for generating the test set 324 may involve:

(1) Step 502: obtain the first set of candidate samples $\{B_j: j=1, \ldots, N_B\}$, as discussed above.

(2) Perform an update process for each candidate sample by, for each candidate sample $B_j(j=1, \ldots, N_B)$:

(a) Initially, $P_j=B_j$.

(b) Step 604$a$: Use the specific ML classification model 322 to generate the plurality of values $p_k(k=1, \ldots, N_c)$ for $P_j$. Generate the score for $P_j$ using these generated values $p_k(k=1, \ldots, N_c)$ for $P_j$.

(c) Step 602: Generate the second candidate sample $Q_j$ by performing a (possibly random) change/perturbation on $P_j$.

(d) Step 604$b$: Use the specific ML classification model 322 to generate the plurality of values $p_k(k=1, \ldots, N_c)$ for $Q_j$. Generate the score for $Q_j$ using these generated values $p_k(k=1, \ldots, N_c)$ for $Q_j$.

(e) Step 606:

i. Steps 608 and 612: Having compared the two scores, if the score for $Q_j$ is indicative of a higher likelihood than the score for $P_j$, then set $P_j=Q_j$.

ii. Step 610: Check whether a termination condition been met, e.g. whether one or more of the following is met: the score for $Q_j$ is not indicative of a higher likelihood than the score for $P_j$ (and, potentially, has not been for a predetermined number of previous update steps); the number of update steps performed for this candidate sample $B_j$ is now a predetermined threshold; a difference between the two scores is below a predetermined threshold (and, potentially, has not been for a predetermined number of previous update steps); etc. If a termination condition has been met, then the updated candidate sample $B^*_j$ is the resultant $P_j$; otherwise, return to (b).

(3) Either set the test set 324 to be all of the updated candidate samples $B^*_j$; or select certain updated candidate samples $B^*_j$ to form the test set 324 (e.g. a predetermined number of updated candidate samples $B^*_j$ selected as being the ones with the lowest score).

EXAMPLE 2

Example 2 builds on Example 1. In particular, the initial techniques of Example 1 may be viewed as steps for a first subsequence of the sequence of one or more update steps 502$_j$ for the candidate sample $B_j(j=1, \ldots, N_B)$ (i.e. a first phase), with Example 2 then adding steps for a second subsequence of the sequence of one or more update steps 502$_j$ after the first subsequence (i.e. a second phase). The second phase may be viewed as a refinement of the first phase.

In particular, during the second phase, the classification measures for the current candidate sample $P_j$ and for the second candidate sample $Q_j$ are a respective identification of the class for that sample generated using the specific ML classification model 322, i.e. the class to which, according to the specific ML classification model 322, that sample belongs. Assessing these generated classification measures at the step 606 then comprises: if the classification measure for the second candidate sample $Q_j$ is the same as the classification measure for the current candidate sample $P_j$ (i.e. the two samples are determined to be in the same class) terminating the second subsequence at the step 610; whereas if the classification measure for the second candidate sample $Q_j$ is not the same as the classification measure for the current candidate sample $P_j$ (i.e. the two samples are determined to be in different classes) then: for each the current candidate sample $P_j$ and the second candidate sample $Q_j$, generating a respective score for that sample as discussed above with reference to Example 1 and, if the score for the second candidate sample $Q_j$ is indicative of a higher likelihood than the score for the current candidate sample $P_j$, setting (at the step 612) the current candidate sample $P_j$ to be the second candidate sample $Q_j$.

Thus, in this example, the method for generating the test set 324 involves:

(1) Step 502: obtain the first set of candidate samples $\{B_j: j=1, \ldots, N_B\}$, as discussed above.

(2) Perform an update process for each candidate sample by, for each candidate sample $B_j(j=1, \ldots, N_B)$:

(a) Initially, $P_j=B_j$.

(b) Step 604$a$: Use the specific ML classification model 322 to generate the plurality of values $p_k(k=1, \ldots, N_c)$ for $P_j$. Generate the score for $P_j$ using these generated values $p_k(k=1, \ldots, N_c)$ for $P_j$.

(c) Step 602: Generate the second candidate sample $Q_j$ by performing a (possibly random) change/perturbation on $P_j$.

(d) Step 604$b$: Use the specific ML classification model 322 to generate the plurality of values $p_k(k=1, \ldots, N_c)$ for $Q_j$. Generate the score for $Q_j$ using these generated values $p_k(k=1, \ldots, N_c)$ for $Q_j$.

(e) Step 606:

i. Steps 608 and 612: Having compared the two scores, if the score for Q is indicative of a higher likelihood than the score for $P_j$, then set $P_j=Q_j$.

ii. End Phase 1 and move to Phase 2 if one or more criteria are met, e.g. whether one or more of the following is met: the score for $Q_j$ is not indicative of a higher likelihood than the score for $P_j$ (and, potentially, has not been for a predetermined number of previous update steps); the number of update steps performed for this candidate sample $B_j$ is now a predetermined threshold; a difference between the two scores is below a predetermined threshold (and, potentially, has not been for a predetermined number of previous update steps); etc. If such criteria are met, then move to (f) below; otherwise, return to (b).

(f) Step 604a: Use the specific ML classification model 322 to determine the class for $P_j$.

(g) Step 602: Generate the second candidate sample $Q_j$ by performing a (possibly random) change/perturbation on $P_j$.

(h) Step 604b: Use the specific ML classification model 322 to determine the class for $Q_j$.

(i) Step 606:

Steps 608 and 610: Having compared the two classes, if the class for $Q_j$ is the same as the class for $P_j$, then the updated candidate sample B*, is the resultant $P_j$.

Otherwise, step 612: Use the specific ML classification model 322 to generate the plurality of values $p_k(k=1, \ldots, N_c)$ for $P_j$ (it will be appreciated that these scores may already have been generated at (f) above and so do not need regenerating). Generate the score for $P_j$ using these generated values $p_k(k=1, \ldots, N_c)$ for $P_j$. Use the specific ML classification model 322 to generate the plurality of values $p_k$ $(k=1, \ldots, N_c)$ for $Q_j$ (it will be appreciated that these scores may already have been generated at (h) above and so do not need regenerating). Generate the score for $Q_j$ using these generated values $p_k(k=1, \ldots, N_c)$ for $Q_j$. If the score for $Q_j$ is indicative of a higher likelihood than the score for $P_j$, then set $P_j=Q_j$. Return to step (f).

(3) Either set the test set 324 to be all of the updated candidate samples B*$_j$; or select certain updated candidate samples B*$_j$ to form the test set 324 (e.g. a predetermined number of updated candidate samples B*$_j$ selected as being the ones with the lowest score).

In the above, steps (2)(a)-(e) form the first phase and steps (2)(f)-(i) form the second phase.

EXAMPLE 3

In this example, the second candidate sample $Q_j$ is generated at the step 602 by implementing a (possibly random) change to the current candidate sample $P_j$. The classification measures for the current candidate sample $P_j$ and for the second candidate sample $Q_j$ are a respective identification of the class for that sample generated using the specific ML classification model 322, i.e. the class to which, according to the specific ML classification model 322, that sample belongs. Assessing these generated classification measures at the step 606 then comprises: at the step 610, if the classification measure for the second candidate sample $Q_j$ is the same as the classification measure for the current candidate sample $P_j$ (i.e. the two samples are determined to be in the same class), terminating the sequence of one or more update steps 502; for the candidate sample $B_j$ (j=1, ..., $N_B$); if, however, the classification measure for the second candidate sample $Q_j$ is not the same as the classification measure for the current candidate sample $P_j$ (i.e. the two samples are determined to be in different classes), then at the step 612, setting current candidate sample $P_j$ to be the second candidate sample $Q_j$, and also reducing the size of the change to be applied to the candidate sample $P_j$ when generating a second candidate sample $Q_j$ at the step 602 for the next update step. Thus, the size of the change progressively gets smaller and smaller until both the current candidate sample $P_j$ and the second candidate sample $Q_j$ are found to be in the same class. The size of the change may be viewed as a distance between the current candidate sample $P_j$ and the second candidate sample $Q_j$ using a distance metric for the sample space 250. Due to this progressively smaller size for the change implemented at the step 602, the identification at the step 608 that the classification measure for the second candidate sample $Q_j$ is not the same as the classification measure for the current candidate sample $P_j$ is indicative that the second candidate sample $Q_j$ is more likely to be "sensitive" than the current candidate sample $P_j$ (as the second candidate sample $Q_j$ was arrived at using a smaller change than for the current candidate sample $P_j$, and so is more likely to be closer to a class boundary).

Thus, in this example, the method for generating the test set 324 involves:

(1) Step 502: obtain the first set of candidate samples {$B_j$: j=1, ..., $N_B$}, as discussed above.

(2) Perform an update process for each candidate sample by, for each candidate sample $B_j$ (j=1, ..., $N_B$):

(a) Initially, $P_j=B_j$.

(b) Step 604a: Use the specific ML classification model 322 to determine the class for $P_j$.

(c) Step 602: Generate the second candidate sample $Q_j$ by performing a (possibly random) change/perturbation on $P_j$. If this is not the first update step of the sequence 502j, then the change for this update step is smaller than the change for the previous update step.

(d) Step 604b: Use the specific ML classification model 322 to determine the class for $Q_j$.

(e) Step 606:

i. Steps 608 and 610: Having compared the two classes, if the class for $Q_j$ is the same as the class for $P_j$, then the updated candidate sample B*$_j$ is the resultant $P_j$.

ii. Otherwise, step 612: set $P_j=Q_j$. Return to step (b).

(3) Either set the test set 324 to be all of the updated candidate samples B*j; or select certain updated candidate samples B*$_j$ to form the test set 324 (e.g. a predetermined number of updated candidate samples B*$_j$ selected as being the ones with the smallest size change at the end of their respective sequence 502).

As will be appreciated, this third example is useful for when the test set creation system 320 does not have access to the values $p_k(k=1, \ldots, N_c)$ that the specific ML classification model 322 would generate. It will, however, be appreciated that this third example could still be used in situations in which the test set creation system 320 does indeed have access to the values $p_k(k=1, \ldots, N_c)$ that the specific ML classification model 322 would generate.

It will be appreciated that, for this third example, the sequence of one or more update steps 502; for the candidate sample $B_j$ (j=1, ..., $N_B$) may involve additional steps (e.g.

before or after) the steps (2)(a)-(e) discussed above, so that the steps (2)(a)-(e) may be viewed as a subsequence of steps in a larger sequence of one or more update steps 502; for the candidate sample $B_j$(j=1, . . . , $N_B$). Indeed, for example, whilst Example 2 above added steps to the end of Example 1 as a second phase, the steps (2)(a)-(e) of Example 3 could be used as the second phase instead of the second phase steps discussed in Example 2.

EXAMPLE 4

One could use any method of generating a so-called "adversarial example" for the model, and treat the adversarial example as a test sample of the test set 324. Adversarial examples and their method of generation (both with and without full access to the model and the intermediate values is generates) are well-known—see, for example, https://openai.com/blog/adversarial-example-research/and https://towardsdatascience.com/getting-to-know-a-black-box-model-374e180589ce, the entire disclosures of which are incorporated herein by reference in their entireties.

(c) Experimental Results

An example experiment to illustrate the efficacy and effectiveness of embodiments of the invention is set out below. In this experiment, the well-known "two-spirals" classification task is used, namely: given the x and y coordinates of a point, the task aims to determine if the point belongs to class (spiral) 1 or class (spiral) 2. Given a coordinate pair, it is assumed that different models may assign it with different classes, whereas identical models always assign the same class to the coordinate pair.

Figure 7:
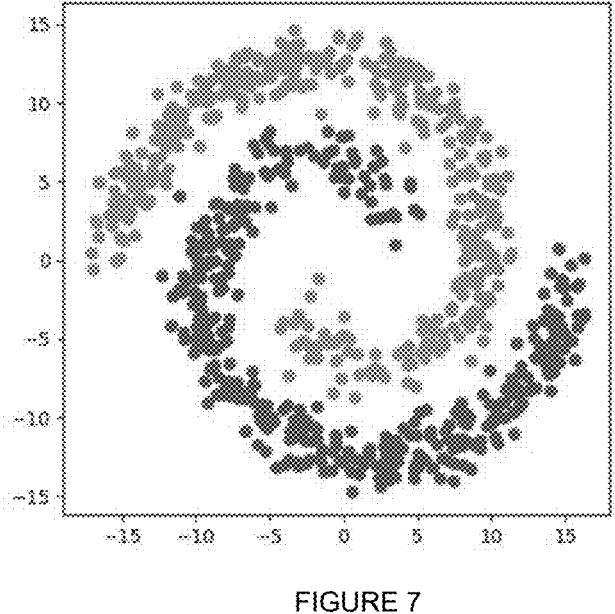
FIG. 7 illustrates an example of a two-spiral dataset.

The Data:

First, a standard two-spiral dataset was created. Next, a noise value was added to the x and y coordinates for each of the points. FIG. 7 illustrates an example resulting two-spiral dataset. 2,000 points were created to form the training set. A different set of 2,000 points were created to form the validation set for verification/validation of the trained models.

The Models:

The multilayer perceptron (MLP) model was used. As is well-known, MLP is a class of the feedforward artificial neural network. Throughout the experiments, the MLP models that were used consisted of the following architecture:

an input layer with 12 units, input data dimension of 2, the activation function of tanh one or more hidden layers where each hidden layer is with 12 hidden units, the activation function of tanh an output layer with 1 unit, the activation function of sigmoid The number of hidden layers used ranged from 1 to 4. There were 9 different number of epochs used: 48, 49, 50, 98, 99, 100, 148, 149, 150. The batch size used was 10. The total number of models trained was 36 (4×9). Next, based on model verification/validation using the validation set, models with reasonable performance (i.e. max (false positive rate, false negative rate)<5%) were selected. This resulted in 18 models, leading to 153 (18×17/2) model pairs. Each model pair contains two different models—with the aim that, for each pair, a test could be performed with one of the models being (or acting as) the specific ML classification model 322 and the other being (or acting as) the ML classification model 312 . . .

Throughout the experiments, the models were trained with the generated training set as described above.

Generating the test set 324:

The following technique was used to generate the test set 324:

Input: the model, M (float) indicating a multiplier, T (integer) indicating the number of points generated from an interval, P (integer) indicating the number of repetitions of a searching process, interval [$x_{min}$, $x_{max}$] indicating the minimum and maximum number for the x-coordinates of the test set.

Output: two samples for the test set 324.

Steps:

Generate T evenly spaced numbers over the interval [$x_{min}$, $x_{max}$].

Obtain samples ($x_1$, $x_1$×M), ($x_2$, $x_2$×M), . . . , ($x_T$, $x_T$×M).

Use the model to obtain the samples' respective predictions/classes as $z_1$, $z_2$, . . . , $z_T$.

Let ($x_A$, $x_A$×M), ($x_B$, $x_B$×M) be two neighboring samples having different predictions/classes, i.e. $z_A{\neq}z_B$. Assume $x_A{<}x_B$.

Execute the following binary search P times:

Set $$x_{MID} = x_A + \frac{x_B - x_A}{2}$$

Use the model to obtain prediction/class $z_{MID}$ for the point ($x_{MID}$, $x_{MID}$×M).

If $z_{MID}=z_A$, Set $x_A=x_{MID}$.

If $z_{MID}=z_B$, set $x_B=x_{MID}$.

Return ($x_A$, $x_A$×M) and ($x_B$, $x_B$×M) as test samples.

In this experiment, P=N=10, and M took values of 1.0 or 0.5. For this experiment, 28 test samples were generated for each model's test set 234.

The above may be viewed as an implementation of Example 3 above. In particular:

the sample ($x_A$, $x_A$×M) may be taken to be the candidate sample $B_j$ the second candidate samples $Q_j$ is the point ($x_{MID}$, $x_{MID}$×M); and the updated candidate samples B*, are ($x_A$, $x_A$×M) and ($x_B$, $x_B$×M). This could, equally, be viewed as performing the sequence of one or more update steps for two candidate samples in parallel. In particular: the samples ($x_A$, $x_A$×M) and ($x_B$, $x_B$×M) may be taken to be two initial candidate samples B;

the second candidate sample $Q_j$ for both is the point ($x_{MID}$, $x_{MID}$×M); and the updated candidate samples B*$_j$ are ($x_A$, $x_A$×M) and ($x_B$, $x_B$×M) respectively.

Tests:

An example of a single test involves:

Input: model A, model B, sample point (x,y)

Output: number of errors

Steps:

Obtain model A's prediction/class $z_A$ for sample point (x,y).

Obtain model B's prediction/class $z_B$ for sample point (x,y).

Return 0 if $z_A$ equals $z_B$; otherwise, return 1

The sample sizes used range from 1 to 20. For each of the sample sizes, first the "sensitive" samples were randomly selected from the test set 324 for model A, and then "regular" samples were randomly selected from the whole sample space 250. The above-described test steps were then executed on each of the selected samples. For each of the sample sizes, the above process was repeated 10 times. Indeed, when testing using "regular" samples, a larger range of sample sizes was needed (from 1 to 1000) to enable comparisons with embodiments of the invention that use "sensitive" samples.

Metric:

Error rate was used to show how likely a chosen method (either using "sensitive" samples" or "regular" samples) detects two different models as identical. This metric is defined as $$\text{Error rate} = \frac{\text{Number of tests where two different}}{\text{Total number of tests}}.$$

The lower the error rate, the better the method differentiates two different models.

Figure 8:
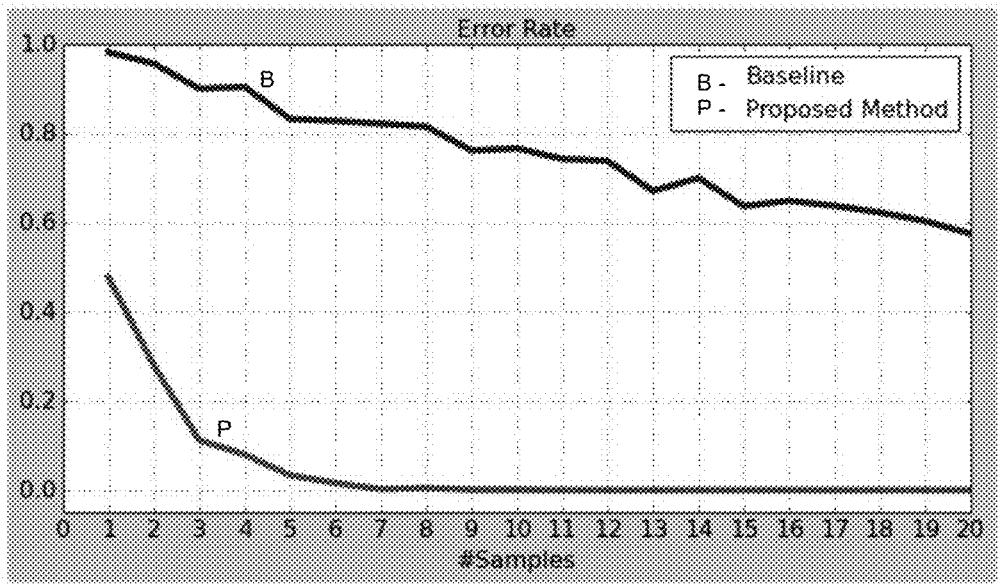
Figure 9:
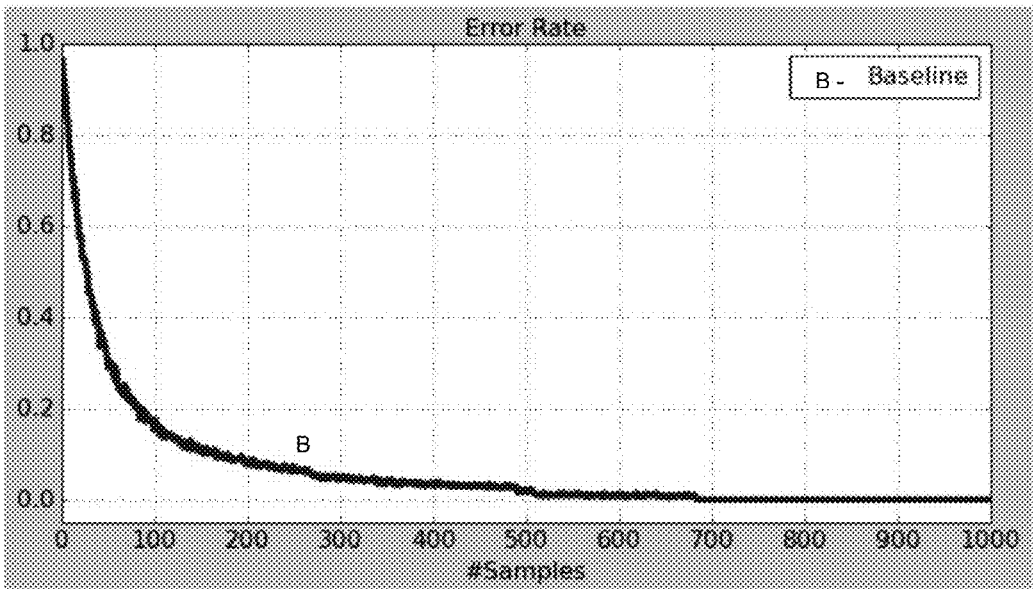

Findings:

FIGS. 8 and 9 are graphs showing the error rate for the testing method of FIG. 4 when using either the test set 324 (the proposed method) or just "regular" (purely randomly selected) test samples (the baseline method). As shown in FIG. 8, embodiments of the invention (the proposed method) outperform the baseline regarding error rates. Specifically, the proposed method required 11 samples to achieve an error rate of 0. The baseline required 691 samples (46 times larger) for comparable performance (as shown in FIG. 9). One sample from the test set 324 on average achieves an error rate of 0.47712 and the baseline requires 27 regular samples to achieve a comparable rate of 0.4977.

Figure 10:
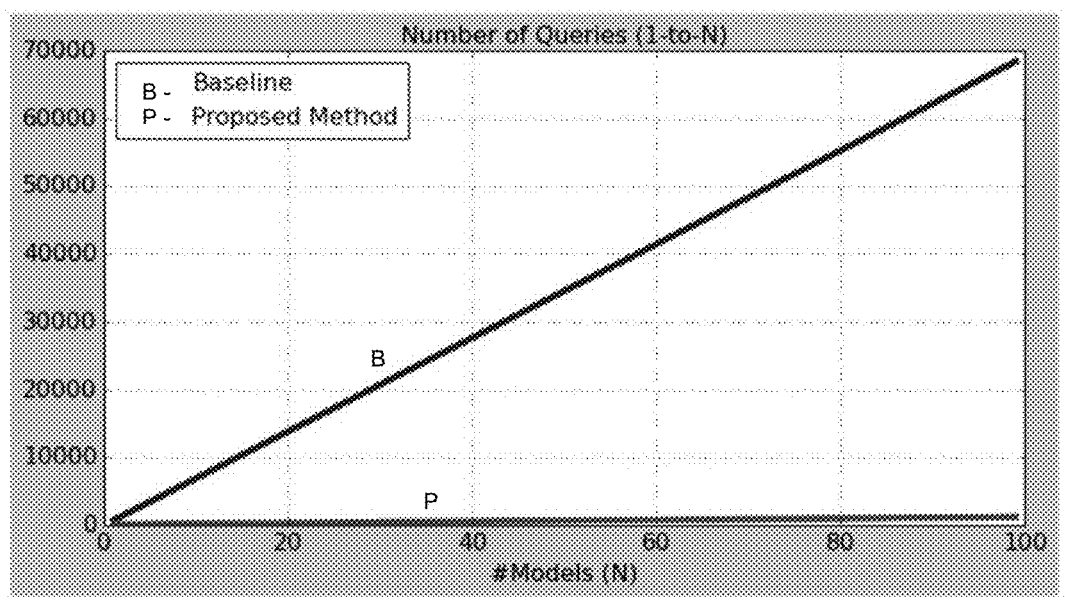
FIGS. 8, 9 and 10 illustrate example experiment results using an embodiment of the invention.

If one defines a 1 to N scenario as follows: consider one base model and a list of N models, the task is to detect whether any of the N models are identical with the base model. To achieve a perfect performance (an error rate of 0), the number of queries required for the baseline is 691×N; the number for the proposed method is 80+11×N (where here, in this experiment, there were 80 queries to generate the test set 324). As shown in FIG. 10, the required number of queries of the baseline method is significantly larger (from 7 to 58 times) than that of the proposed method.

(d) Modifications

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or one or more graphical processing units (GPUs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then one or more storage media and/or one or more transmission media storing or carrying the computer program form aspects of the invention. The computer program may have one or more program instructions, or program code, which, when executed by one or more processors (or one or more computers), carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, byte code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method comprising:

obtaining, by a processor associated with a classification system, a first set that comprises a plurality of candidate samples applicable to a specific machine-learning classification model; and updating, by the processor, the first set, said updating comprising, for each candidate sample in the plurality of candidate samples, performing a corresponding sequence of one or more update steps, wherein each update step comprises:

generating a second candidate sample based on said candidate sample;

generating, for each of said candidate sample and the second candidate sample, a corresponding classification measure using the specific machine-learning classification model; and assessing the generated classification measures, wherein said assessing comprises, based on a comparison of the generated classification measures, performing at least one of:

terminating the sequence of one or more update steps; or setting said candidate sample to be the second candidate sample if the comparison indicates that the second candidate sample is more likely than the said candidate sample to have a corresponding small modification that causes a change in classification result produced using the specific machine-learning classification model; and generating, by the processor, a test set based on the updated first set, the test set comprising a plurality of test samples corresponding to some or all of the candidate samples in the updated first set, the test set associated with the specific machine-learning classification model, wherein, for each test sample in the test set, there is a corresponding small modification for that test sample that causes a change in the classification result produced for that test sample using the specific machine-learning classification model.

2. The method of claim 1, wherein said generating a second candidate sample based on said candidate sample comprises generating the second candidate sample by performing a random change to said candidate sample.

3. The method of claim 1, wherein, for each candidate sample, for each update step of a first subsequence of the corresponding sequence of one or more update steps:

for each of said candidate sample and the second candidate sample, the corresponding classification measure is a score generated by:

using the specific machine-learning classification model to generate a corresponding plurality of values, each value indicative of that sample belonging to a corresponding class; and using a score function to generate the score for that sample based on the corresponding plurality of values, the score indicative of a likelihood that there is a small modification for that sample that causes a change in the classification result produced for that sample using the specific machine-learning classification model; and assessing the generated classification measures comprises: if the classification measure for the second candidate sample is indicative of a higher likelihood than the classification measure for said candidate sample, setting said candidate sample to be the second candidate sample.

4. The method of claim 3, wherein, for each candidate sample, for each update step of a second subsequence of the corresponding sequence of one or more update steps after the first subsequence:

for each of said candidate sample and the second candidate sample, the corresponding classification measure is an identification of the class for that sample generated using the specific machine-learning classification model; and assessing the generated classification measures comprises:

if the classification measure for the second candidate sample is the same as the classification measure for said candidate sample, terminating the second subsequence;

if the classification measure for the second candidate sample is not the same as the classification measure for said candidate sample:

for each of said candidate sample and the second candidate sample:

using the specific machine-learning classification model to generate a corresponding plurality of values, each value indicative of that sample belonging to a corresponding class; and using a score function to generate the score for that sample based on the corresponding plurality of values, the score indicative of a likelihood that there is a small modification for that sample that causes a change in the classification result produced for that sample using the specific machine-learning classification model; and if the score for the second candidate sample is indicative of a higher likelihood than the score for said candidate sample, setting said candidate sample to be the second candidate sample.

5. The method of claim 3, wherein each value represents a probability that the corresponding sample belongs to the corresponding class.

6. The method of claim 5, wherein for each of the first candidate sample and the second candidate sample, the corresponding plurality of values are normalized to have a predetermined total.

7. The method of claim 1, wherein, for each candidate sample, for each update step of a first subsequence of the corresponding sequence of one or more update steps:

for each of said candidate sample and the second candidate sample, the corresponding classification measure is an identification of class for that sample generated using the specific machine-learning classification model;

assessing the generated classification measures comprises:

if the classification measure for the second candidate sample is the same as the classification measure for said candidate sample, terminating the first subsequence if a termination condition is met;

if the classification measure for the second candidate sample is not the same as the classification measure for said candidate sample:

setting said candidate sample to be the second candidate sample; and reducing the size of the random change to be applied to the candidate sample when generating a second candidate sample at the next update step.

8. The method of claim 1, wherein one or more of the test samples in the test set are generated as adversarial examples for the specific machine-learning classification.

9. The method of claim 1, further comprising:

using the classification system to generate, for each test sample in a predetermined test set that comprises a plurality of test samples, a corresponding classification result; and identifying either (i) that the classification system is using the specific machine-learning classification model if, for each test sample in the test set, the corresponding classification result matches a classification result produced for that test sample using the specific machine-learning classification model or (ii) that the classification system is not using the specific machine-learning classification model if there is a test sample in the test set for which the corresponding classification result does not match the classification result produced for that test sample using the specific machine-learning classification model.

10. A test set generation system:

a processor configured to:

obtain a first set that comprises a plurality of candidate samples applicable to a specific machine-learning classification model of a classification system; and update the first set by, for each candidate sample in the plurality of candidate samples, performing a corresponding sequence of one or more update steps, wherein each update step comprises:

generating a second candidate sample based on said candidate sample;

generating, for each of said candidate sample and the second candidate sample, a corresponding classification measure using the specific machine-learning classification model; and assessing the generated classification measures, wherein said assessing comprises, based on a comparison of the generated classification measures, performing at least one of:

terminating the sequence of one or more update steps; or setting said candidate sample to be the second candidate sample if the comparison indicates that the second candidate sample is more likely than the said candidate sample to have a corresponding small modification that causes a change in classification result produced using the specific machine-learning classification model; and generate a test set based on the updated first set, the test set comprising a plurality of test samples corresponding to some or all of the candidate samples in the updated first set, the test set associated with the specific machine-learning classification model, wherein, for each test sample in the test set, there is a corresponding small modification for that test sample that causes a change in the classification result produced for that test sample using the specific machine-learning classification model.

11. The test set generation system of claim 10, wherein the identification system is further configured to:

use the classification system to generate, for each test sample in a predetermined test set that comprises a plurality of test samples, a corresponding classification result; and identify either (i) that the classification system is using the specific machine-learning classification model if, for each test sample in the test set, the corresponding classification result matches a classification result produced for that test sample using the specific machine-learning classification model or (ii) that the classification system is not using the specific machine-learning classification model if there is a test sample in the test set for which the corresponding classification result does not match the classification result produced for that test sample using the specific machine-learning classification model.

* * * * *